No. 755,952. PATENTED MAR. 29, 1904.
W. J. B. SMITH.
FRICTION DEVICE FOR IMPULSE MOTORS.
APPLICATION FILED JAN. 9, 1903.

NO MODEL.

Witnesses
Chas. P. Day
[signature]

Inventor.
Walter J. B. Smith

By Arnold & Serlow
Attorneys

No. 755,952. Patented March 29, 1904.

UNITED STATES PATENT OFFICE.

WALTER J. B. SMITH, OF PROVIDENCE, RHODE ISLAND.

FRICTION DEVICE FOR IMPULSE-MOTORS.

SPECIFICATION forming part of Letters Patent No. 755,952, dated March 29, 1904.

Application filed January 9, 1903. Serial No. 138,357. (No model.)

*To all whom it may concern:*

Be it known that I, WALTER J. B. SMITH, a resident of Providence, in the county of Providence and State of Rhode Island, have invented certain new and useful Improvements in Friction-Drives for Impulse-Motors; and I do hereby declare that the following is a full, clear, and exact description thereof, reference being had to the accompanying drawings, and to the letters of reference marked thereon, which form a part of this specification.

This invention relates to mechanism for the transmission of power from impulse-motors, and has for its object to construct a yielding connection making possible and practical the use of gears, sprocket-chains, or the like to transmit power from an explosion-motor to a bicycle or other vehicle to which it may be attached without causing the wheel to slip on the ground or bringing an undue strain on the transmitting connections, thus obtaining all of the advantages with none of the disadvantages attending the use of more flexible connections, such as the ordinary leather belt, which latter method of driving does not satisfactorily meet the requirements under present existing conditions.

The invention is fully explained in this specification and illustrated in the accompanying drawings.

Figure 1:
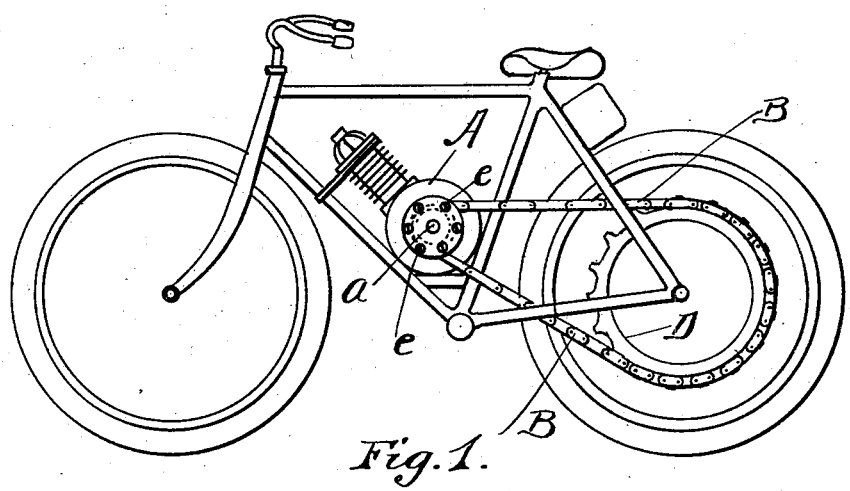
Figure 2:
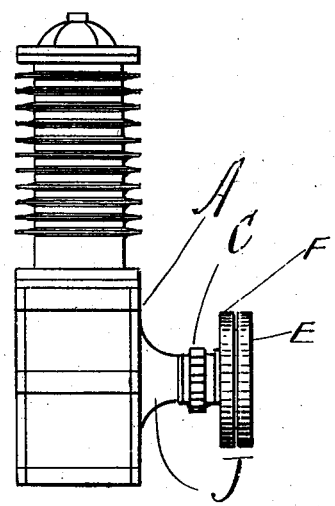
Figure 3:
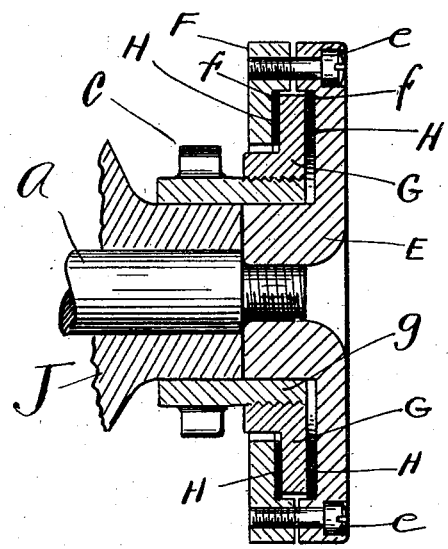

Figure 1 represents a motor-driven bicycle with my device attached thereto. Fig. 2 represents an end elevation of a motor with my device attached to the crank-shaft. Fig. 3 is an enlarged sectional elevation showing plainly the sprocket and arrangement of the adjustable friction-plates.

In the construction, A is the motor, preferably of the explosion type, to the crank-shaft $a$ (see Fig. 3) of which may be attached my device.

B is the power-transmission sprocket-chain.

C is the small sprocket, which is connected to the rear wheel of the bicycle.

One method of connecting my device to the motor is illustrated in Fig. 3, in which the outer plate E is shown secured to the end of the motor crank-shaft $a$. A plate F is held on the inside and adjustably secured to plate E by screws $e\ e$. Both of these plates E and F are recessed out on their inner faces at $f\ f$ to receive the flange of the collar G, which collar is fixed to the hub $g$ of the small sprocket C. Held in the recess $f\ f$ and on either side of this flange G are thin friction-washers H H, which may be made of vulcanized fiber, rawhide, or any suitable material.

J is a hub or bearing projecting from the crank-case of the motor and which may be turned to form a bearing for the sprocket-wheel C, which fits over it.

I will now describe the operation and some of the advantages attending the use of my invention. Heretofore it has been found quite impracticable in driving motor-cycles by an explosion gasolene-engine to use the more rigid types of transmission, such as the sprocket-chain or gears or their equivalents. This class of motor receives a violent impulse at each explosion, and when connected by a positive transmission-drive to the rear wheel it causes the tire to skip or slip on the ground, and as these explosions occur very frequently—say about seven hundred times a minute—it is very apparent that the tire would soon wear out; but by the use of my friction-disk, which is placed so as to receive and yield to these excessive strains, the above-mentioned difficulties are successfully obviated. The tension on this friction may readily be set up by means of the screws $e\ e$ and nicely adjusted to the weight of each individual rider, thereby making it possible to utilize all of the power of the motor up to the slipping-point of the wheel.

The belt-drive, while very unsatisfactory, has heretofore been the most practical method known for driving the motor-cycle; but its tension is constantly changing, due to flying dust and mud adhering to the belt, and in addition to this the effect of the ever-varying condition of the atmosphere necessitates frequent and constant attention. The initial tension of a belt is also necessarily high compared to the chain-drive, causing a considerable increase in friction, and consequent wearing of the bearing-surfaces.

In applying my device to a motor-driven bicycle it may be attached to the motor direct, as shown in the drawings, on an intermediate or counter shaft, or upon the driving-wheel. It is also applicable to the automobile or any other place where a chain or gears are required to transmit the power from an impulse-motor.

As it will be readily understood, the device is a simple, inexpensive, and extremely practicable and efficient method of performing the work required of it.

Having thus described my invention, what I claim as new, and desire to secure by Letters Patent, is—

1. An explosion-motor having a crank-shaft, a bearing therefor, a friction-plate mounted on said shaft, a second friction-plate carried by said former plate, and a sprocket-wheel mounted on said bearing and having a disk fitting between said friction-plates.

2. An explosion-motor having a crank-shaft, a bearing therefor, a friction-plate secured to said shaft, a second friction-plate carried by said former plate and having an annular opening, a sprocket-wheel mounted on said bearing, and a collar secured upon said sprocket and extending through said annular opening, said collar having a disk fitting between said friction-plates.

3. An explosion-motor having a crank-shaft, a bearing therefor, a friction-plate having a hub mounted on said shaft, a second friction-plate carried thereby, a sprocket-wheel mounted on said bearing and having a hub fitting over the hub of said friction-plate and a disk carried by said sprocket-wheel and fitting between said friction-plates.

4. An explosion-motor having a crank-shaft, a bearing therefor, a friction-plate secured to said shaft, a second friction-plate carried by said former plate and having an annular opening, a sprocket-wheel mounted on said bearing and having a hub projecting through the opening of said friction-plate, and a disk fitting between said friction-plates and having a hub mounted on the hub of said sprocket.

In testimony whereof I have hereunto set my hand this 23d day of December, A. D. 1902.

WALTER J. B. SMITH.

In presence of—
HOWARD E. BARLOW,
CHAS. P. DAY.